United States Patent Office 2,729,585
Patented Jan. 3, 1956

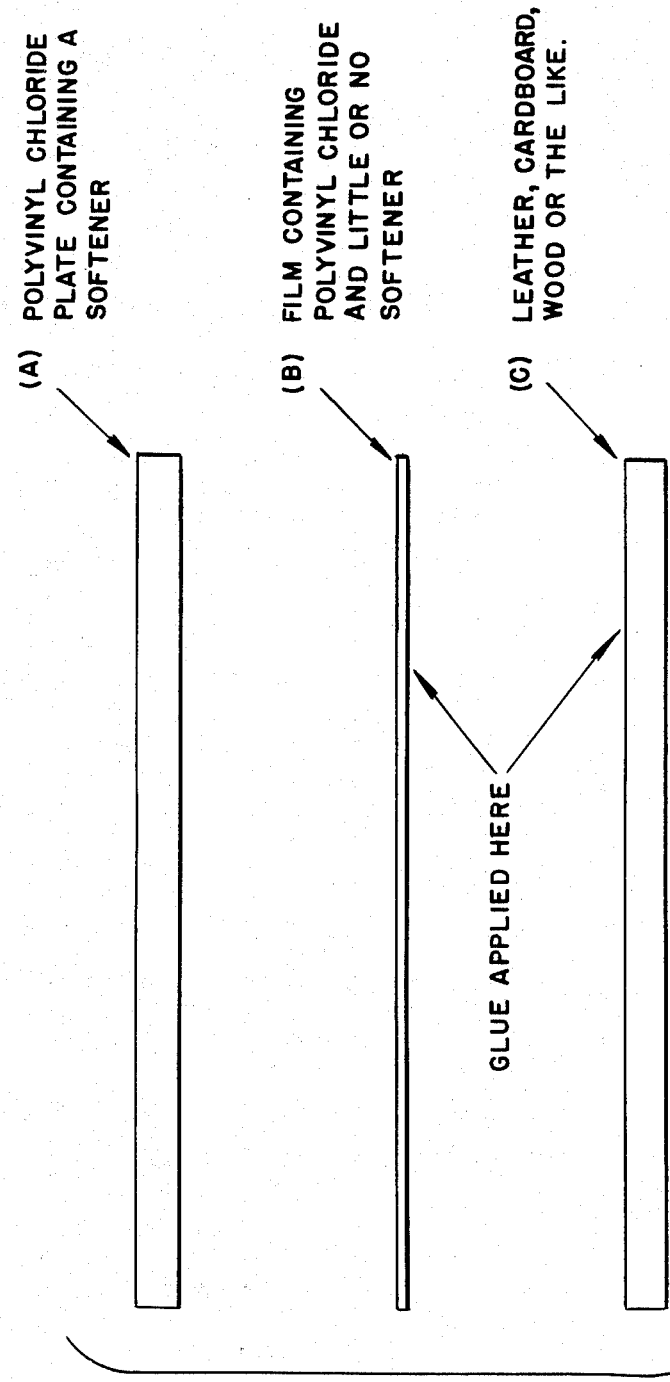

2,729,585

PROCESS FOR ADHERING POLYVINYL CHLORIDE CONTAINING A SOFTENER TO A NON-METALLIC LAYER

Wolfgang Gruber, Joseph Heckmaier, and Martin Doriat, Burghausen, Upper Bavaria, Germany, assignors to Wacker-Chemie G. m. b. H., a corporation Application September 16, 1952, Serial No. 309,948

Claims priority, application Germany October 12, 1951

9 Claims. (Cl. 154—139)

This invention relates to adhesively joining artificial materials containing softeners, either to each other or to layers of other non-metallic substances such as wood, leather, cardboard, etc., and it has for its object to provide a novel and improved process for this purpose.

Another object of the invention is to provide a more effective and durable adhesive bond than has heretofore been possible between materials of the above type, at least one of which materials does not normally lend itself to an effective adhesive bond because of the ambulatory or diffusive character of the softener contained therein.

Still another object is to provide a laminated article such as a shoe sole or any other desired article which is not only composed of layers of the above type united in a permanent unitary structure but also possesses other advantageous physical properties.

Various other objects and advantages will be apparent as the nature of the invention is more fully disclosed.

When layers of artificial materials containing softeners are joined with one another or with other materials by gluing or pasting, the migratory or diffusive nature of the softeners, in many cases at ordinary temperatures but particularly when heated, results in a decrease in adhesiveness.

The diffusive capacity of the softening agent may be readily observed if objects made of softened polyvinyl chloride are placed on lacquered objects, whereby, for example, the nitrocellulose lacquer is attacked. This phenomenon is particularly disadvantageous for example when it is desired to join sole plates of softened polyvinyl chloride to leather, or when thick laminations of wood containing fillers and softeners are to be joined to cardboard or the like in the manufacture of utensils for general use. Attempts have been made to eliminate these undesirable concomitant phenomena by selecting softeners which exhibit small migration tendencies, but only modest results have been obtained.

We have now discovered that it is possible to bind softener-containing artificial layers of the above type in a satisfactory and permanent manner with other artificial layers, or with other non-metallic substances such as wood, leather, cardboard and the like, if the said softener-containing artificial layer is first provided with a closure layer or facing composed of artificial material which is either softener-free or else has a low softener content. With the aid of this closure layer, upon which the cement or other adhesive may be placed, the joining of the softener-containing layer with the other layers or materials is effected.

It is preferable to use in the "softener-poor" closure layer little if any migratory ("migration-liking") softeners. The joining of the softener-containing material with the closure layer takes place advantageously at an elevated temperature under pressure in presses, rollers or the like, or by means of coating or dipping in suitable solutions which contain no softeners. By roughening the closure layer its adhesibility may be enhanced. It can also contain mixed polymerisates besides a small percentage of softeners. A further advantage of the hard "softener-poor" closure layers is that they impart, for instance to polyvinyl chloride shoe soles, a desirable rigidity and therefore the running layer proper may be made softer, thereby increasing its resistance to cold and reducing any tendency to rub off.

Shoe soles made of polyvinyl chloride, which are provided in the manner described above with a softener-free polyvinyl chloride layer on the cementing side, and are then glued on, also show after long storing no deterioration of the cementing or gluing.

The accompanying drawing is an exploded view of a three-ply laminated sheet embodying the invention.

*Example 1*

A mixture of 100 parts of polyvinyl chloride and 100 parts of (dioctylphthalate) softener is rolled into a plate 4 mm. thick (the plate "A" in the accompanying drawing). Likewise there is rolled a 0.3–0.4 mm. thick foil or film of pure polyvinyl chloride mixed with 2% lead stearate filler, at 170° C. (the film "B" in the accompanying drawing). The plate "A" and the foil "B" are joined together in the hottest possible condition in a tier press preheated to 160°–170° C. and pressed together. The press plates have the shape of a shoe sole, which is transferred during the pressing to the soft layer of the inserted material. Upon cooling the now tightly joined two layers of plate are taken out, the closure layer on the cementing side is roughed up with revolving steel brushes, and desired soles are patterned out and they are cemented to the undersole ("C" in the drawing) with the usual commercial cements. A very durable and highly satisfactory composite structure is thus obtained.

*Example 2*

The layers prepared according to Example 1 are passed through rolls while still in plastic condition and they are joined into a unit. The closure layer is daubed with cement and they are brought together under light pressure with pasteboard. A perfect and enduring laminated material is obtained with this procedure.

*Example 3*

In accordance with Example 1, there are rolled together a softener-containing plate, a softener-free foil or film of polyvinyl chloride, as well as a softener-free film of a mixed polymerisate of polyvinyl chloride with 40% vinyl acetate, in such a way that the mixed polymerisate foil appears on the cementing side. In this case the closure layer consists of two layers of which the one of mixed polymerisate substantially increases the adhesibility.

Although certain specific embodiments are set forth herein for purposes of illustration, it will be evident to those skilled in the art that the invention is capable of various modifications and adaptations within the scope of the appended claims.

The invention claimed is:

1. Process for adhesively joining two layers of non-metallic materials at least one of which comprises polyvinyl chloride containing a softener which normally impairs its adhesiveness, comprising affixing to said softener-containing layer a facing selected from the group consisting of pure polyvinyl chloride and a copolymer of vinyl chloride and vinyl acetate, and then adhesively uniting said facing with the other layer of material.

2. Process for adhesively joining two layers of non-metallic materials at least one of which comprises polyvinyl chloride containing a softener which normally impairs its adhesiveness, comprising affixing to said softener-containing layer a facing of pure polyvinyl chloride, and then adhesively uniting said facing to the other layer of material.

3. Process according to claim 2, in which the facing comprises a mixed polymerisate of vinyl chloride and vinyl acetate.

4. Process according to claim 2, in which the facing contains a filler.

5. A permanent durable laminated structure comprising a plurality of layers of non-metallic materials at least one of which is polyvinyl chloride containing a softener which normally impairs its adhesiveness, a facing selected from the group consisting of pure polyvinyl chloride and a copolymer of vinyl chloride and vinyl acetate affixed to said softener-containing layer, and an adhesive uniting said facing with another of said layers.

6. A permanent durable laminated structure comprising a plurality of layers of non-metallic materials at least one of which is polyvinyl chloride containing a softener which normally impairs its adhesiveness, a facing of pure polyvinyl chloride affixed to said softener-containing layer, and an adhesive uniting said facing with another of said layers.

7. A polyvinyl chloride article containing a softener which normally impairs its adhesive ability, and a facing united therewith and composed of pure polyvinyl chloride.

8. An article according to claim 7, in which the facing consists of a mixed polymerisate of pure vinyl chloride and vinyl acetate.

9. An article according to claim 7, in which the pure polyvinyl chloride contains a filler.

References Cited in the file of this patent
UNITED STATES PATENTS

| | | |
|---|---|---|
| 2,323,562 | Nugent | July 6, 1943 |
| 2,483,465 | Johnson | Oct. 4, 1949 |
| 2,553,124 | Williams et al. | May 15, 1951 |
| 2,572,877 | Morris et al. | Oct. 30, 1951 |